(12) United States Patent
Kikkawa et al.

(10) Patent No.: US 6,636,387 B2
(45) Date of Patent: Oct. 21, 2003

(54) MAGNETIC DISK APPARATUS AND HEAD-SUPPORTING MECHANISM FOR THE SAME

(75) Inventors: Haruhiko Kikkawa, Yokohama (JP); Yasuo Amano, Yokohama (JP); Shigeo Nakamura, Odawara (JP); Osamu Narisawa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 176 days.

(21) Appl. No.: 09/768,470

(22) Filed: Jan. 25, 2001

(65) Prior Publication Data

US 2002/0030943 A1 Mar. 14, 2002

(30) Foreign Application Priority Data

Sep. 12, 2000 (JP) ........................................ 2000-281745

(51) Int. Cl.[7] .............................................. G11B 21/24
(52) U.S. Cl. .................................. 360/294.3; 360/245.3
(58) Field of Search ......................... 360/245.3, 294.3, 360/294.4, 104, 106, 109, 265, 274; 310/328, 367

(56) References Cited

U.S. PATENT DOCUMENTS

| | | | | | |
|---|---|---|---|---|---|
| 5,120,377 A | * | 6/1992 | Morohashi et al. | ...... | 156/89.17 |
| 6,078,473 A | * | 6/2000 | Crane et al. | .............. | 360/294.3 |
| 6,163,434 A | * | 12/2000 | Zhang | ...................... | 360/294.3 |
| 6,229,675 B1 | * | 5/2001 | Tanaka et al. | .............. | 360/265 |
| 6,268,983 B1 | * | 7/2001 | Imada et al. | .............. | 360/294.3 |
| 6,362,938 B1 | * | 3/2002 | Suzuki et al. | ............. | 360/244.2 |

OTHER PUBLICATIONS

Japanese Patent Unexamined Publication No. 12–113615.
Journal of the Institute of Electrical Engineers of Japan, vol. 120, No. 11(Nov. 2000).

* cited by examiner

*Primary Examiner*—William Korzuch
*Assistant Examiner*—Mark Blouin
(74) *Attorney, Agent, or Firm*—Antonelli, Terry, Stout & Kraus, LLP

(57) ABSTRACT

An actuator of a magnetic disk has a laminated construction of piezoelectric flat sheet in which there are two polarized regions separated by a non-polarized region and the polarization direction and the direction of applied magnetic fields are the same as the thickness direction of the piezoelectric flat sheet. The actuator is fixed in such a manner as to bridge the top surfaces of the suspension and suspension-supporting member of the magnetic disk, and is coated with a resin material. The actuator enables vertical vibrations and dust generation which occur in association with the movement of the supporting member to be reduced and the accuracy of head positioning to be improved.

11 Claims, 5 Drawing Sheets

THICKNESS DIRECTION OF PIEZOELECTRIC PLATE

MAGNETIC DISK APPARATUS AND HEAD-SUPPORTING MECHANISM FOR THE SAME

BACKGROUND OF THE INVENTION

The present invention relates to a magnetic disk apparatus and a head-supporting mechanism for the magnetic disk apparatus and, more particularly, to an actuator for high-accuracy positioning of a head that performs the writing-in and reading-out of information in a predetermined position on a magnetic disk on which information is stored.

A voice coil motor has so far been used as an actuator for moving a magnetic head over a desired position on a disk. However, this method had its limits when positioning accuracy was to be improved.

Therefore, in order to ensure that a magnetic head performs higher-accuracy positioning, arrangements in which a second actuator for the fine adjustment of the magnetic head position is disposed between the voice coil motor and the magnetic head have been proposed.

For example, the construction of a second actuator described in JP-A-12-113615 is such that in a magnetic disk apparatus comprising a magnetic head that performs the writing-in and reading-out of information, a magnetic disk on which information is stored, an elastic member which supports the above head, a fixed member which supports the above elastic member, a first actuator for rough movement which moves the above magnetic head over a predetermined position on the magnetic disk, and a second actuator for fine movement which is disposed between the above first actuator and the above magnetic head, the second actuator is a sheet-like structure formed from one piezoelectric flat sheet having electrodes on the top and bottom surfaces and two or more polarized regions in the interior or a plurality of such laminated piezoelectric flat sheets, and the second actuator, which is the above sheet-like structure, is disposed so that the top surface or bottom surface of the second actuator bridges the top surfaces of the above fixed member and above elastic member or the bottom surfaces of the above two members.

Furthermore, the above second actuator is a sheet-like structure made of a piezoelectric material and comprises one piezoelectric flat sheet having electrodes on the top and bottom surfaces or a plurality of such laminated piezoelectric flat sheets. At least one of the above electrodes on the above top and bottom surfaces is separated into two or more portions. The above piezoelectric flat sheet has in the interior a non-polarized region and two or more polarized regions separated by part of the above non-polarized region and polarized in the direction of thickness of the above piezoelectric flat sheet. The above piezoelectric flat sheet is displaced in its in-plane direction by applying an electric field to the above two or more polarized regions within the above piezoelectric flat sheet in the thickness direction of the above piezoelectric flat sheet by using the above electrodes on the top and bottom surfaces of the above piezoelectric flat sheet.

SUMMARY OF THE INVENTION

Because the second actuator in the above prior art is made of ceramics comprising PZT (lead zirconate titanate), etc. which provide a piezoelectric element, the actuator itself is mechanically brittle and mechanical strength poses a problem. Furthermore, this actuator must be metallized with Au, etc. so that electrodes are attached thereto. Therefore, when the element is caused to expand and contract by applying a voltage, fine particles of PZT and Au are generated as dust. These dust particles adhere to the magnetic head and disk, not only contaminating the interior of the magnetic disk apparatus, but also causing a decrease in reliability during the writing-in and reading-out of information.

The object of the present invention is to solve the above-mentioned problem and realize in providing a magnetic disk drive apparatus having a high reliability.

In order to solve the above problem, we carried out experiments and examinations and, as a result, it became apparent that this problem can be solved by the following method.

We found that in a magnetic disk apparatus having a second actuator comprising a piezoelectric element, by the resin coating of the surface of the second actuator, i.e., by applying a liquid adhesive to the surface of the second actuator and causing the adhesive to set, it is possible to prevent fine particles of PZT, which is a material of the actuator, and those of the Au with which the surface is metallized, from being generated as dust during the expansion and contraction of the element while a voltage is being applied.

Details of this method will be described below.

The liquid adhesive used in resin coating is uniformly applied with a film thickness of not more than 10 $\mu$m by usual means such as a dispenser and ink jet and, therefore, it is desirable to use a low-viscosity resin that has a viscosity before curing of not more than 1000 mPa·s.

Photo-setting (UV and visible light) type resins may be used as the resin for application use. However, when thermosetting resins are used, they should be a type that sets at a temperature not higher than the temperature which the piezoelectric element can withstand. Furthermore, resins which combine thermocuring and photo-setting properties may be used in the case of the type which cures at a temperature not higher than the temperature which the piezoelectric element can withstand.

If volatile organic molecules are generated as an outgas from a resin after setting, these volatile organic molecules adhere to the magnetic head and disk, not only contaminating the interior of the magnetic disk apparatus, but also causing a decrease in reliability during the writing-in and reading-out of information. Therefore, the resin for application use must be an adhesive that produces little outgas of, resin after setting.

Moreover, as the properties required of the resin, the adhesive must have a high adhesive strength relative to the Au used in metallization and flexibility after curing so that cracks, etc., are not formed during the expansion and contraction of the piezoelectric element to which a voltage is applied, and at the same time the adhesive must have a low elastic modulus, a high elongation and a low hardness value.

We earnestly examined resins that have these required properties and, as a result, we found that a low-viscosity epoxy resin-based adhesive is an optimum one.

This low-viscosity epoxy resin-based adhesive comprises epoxy oligomer of less than 20 wt % and epoxy monomer of not less than 80% and further contains a polymerization initiator which reacts with heat and light, a catalyst and an additive.

The polymerization initiator that reacts to heat and light and the catalyst may be any of amine-based, acid anhydride-based and cation-based ones.

The additive can be added as far as it does not have an adverse effect on the adhesive property and other properties of the resin. The additive is a surfactant for improving the wettability of an adherend sursurface, a filler for improving the physical properties of a set substance, etc.

For example, Worldlock XOC-11CKF-3 and XOC-11CKF-3H made by Kyoritsu Kagaku Sangyou, etc., can be enumerated as such low-viscosity epoxy resin-based adhesives. However, it should be understood that low-viscosity epoxy resin-based adhesives are not limited to them. Such low-viscosity epoxy resin-based adhesives may be appropriately prepared from epoxy oligomer of less than 20 wt % and epoxy monomer of not less than 80 wt % and further a polymerization initiator with with heat and light, a catalyst and an additive.

On the other hand, adhesives other than low-viscosity epoxy resin-based adhesives are unsuitable as the resin of the invention.

For example, general low-viscosity coating agents are undesirable because they contain solvents or are acrylic resins and, therefore, a large amount of outgas is generated from theses resins after setting.

Because general epoxy resins contain a large amount of epoxy oligomer and have high viscosity, it is difficult to uniformly apply such resins with a film thickness of not more than 10 µm. Furthermore, because these resins after curing lack flexibility and are hard, cracks, etc., are formed by the expansion and contraction of the piezoelectric element during voltage application, causing dust generation, if these resins are used in the actuator. Thus general epoxy resins are also undesirable.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF PREFERRED EMBODIMENTS

Embodiments of the present invention will be described below with reference to the accompanying drawings.

Figure 1:
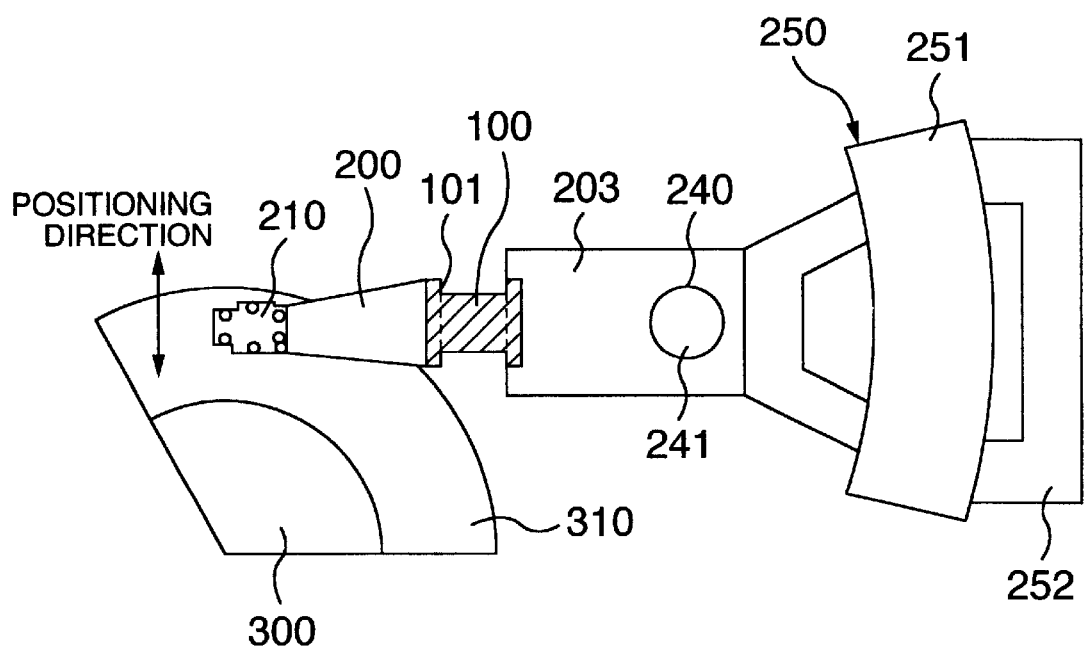
FIG. 1 is a top plan view of a magnetic disk apparatus in an embodiment of the present invention.

FIG. 1 is a top plan view of the arrangement of a magnetic disk apparatus in an embodiment of the present invention.

The magnetic disk apparatus is provided with a magnetic recording disk 310 with a magnetic film formed on its surface for storing information and a spindle motor 300 for rotating the magnetic recording disk 310. The magnetic disk apparatus is further provided with a magnetic head (not shown) for performing the reading-out and writing-in of information of the magnetic recording disk 310, which comprises an electromagnetic conversion element, and a slider (not shown) for floating the magnetic head above the magnetic disk with a constant gap being formed therebetween.

The above slider is installed on a gimbal 210 for passively compensating the position of the magnetic head with respect to the magnetic disk. The gimbal 210 is connected to one end side of a suspension 200, which is an elastic member elastically supporting the magnetic head and slider.

The other end side of the suspension 200 is connected to a suspension-supporting member 230, which is a fixed member. The suspension-supporting member 230 is provided with a first actuator for moving the magnetic head over a predetermined position on the magnetic disk so as to perform rough positioning.

This first actuator comprises a voice coil motor 250, a magnet 251 constituting the voice coil motor, a coil 252, a rotating shaft 241 of suspension-supporting member, which is a center of rotation during the positioning of the magnetic head by means of the voice coil motor, and a bearing 240.

Further, between the voice coil motor and the magnetic head there is provided a second actuator 100 for fine movement in order to perform high-accuracy positioning. The surface of this second actuator is coated with a coating resin 101.

Figure 2A:
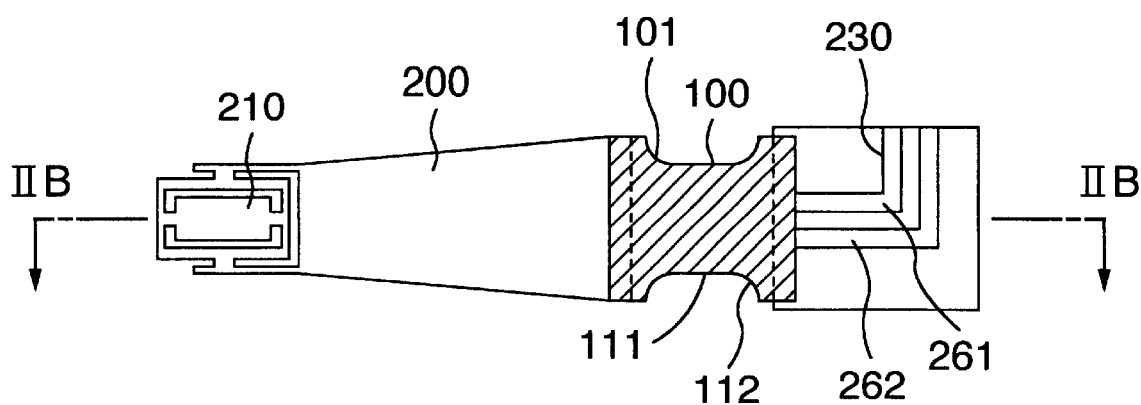
FIG. 2A is a top plan view of the whole of a magnetic head supporting mechanism in the magnetic disk apparatus shown in FIG. 1.
Figure 2B:
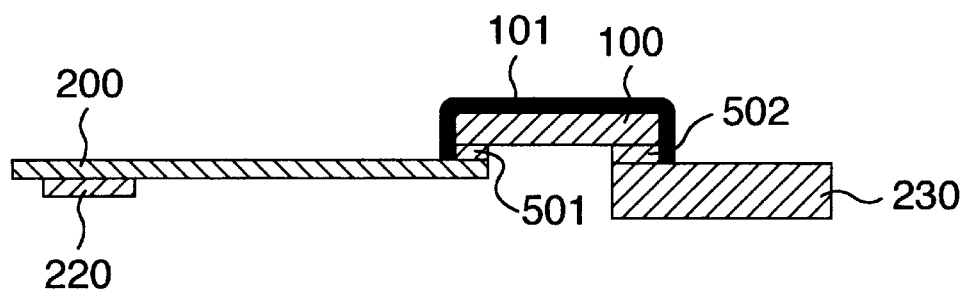
FIG. 2B is a sectional view of the whole magnetic head supporting mechanism shown in FIG. 2A, the view being taken along lines IIB—IIB of FIG. 2A.

FIG. 2A is a top plan view which shows in further detail the whole magnetic head supporting mechanism that ranges from the suspension-supporting member 230 to the magnetic head in the embodiment of the present invention. Further, FIG. 2B is a sectional view of the whole magnetic head supporting mechanism shown in FIG. 2A, the view being taken along lines IIB—IIB of FIG. 2A.

The second actuator 100 comprises a sheet-like structure in which piezoelectric flat sheets are laminated as will be described later. In this embodiment, the second actuator 100 is disposed so that the bottom surface of the second actuator 100 bridges the top surfaces of the suspension-supporting member 230 and suspension 200. The bottom surface of the second actuator 100 and the top surface of the suspension 200 are fixed by an adhesive layer 501.

Similarly, the bottom surface of the second actuator 100 and the top surface of the suspension-supporting member 230 are fixed by an adhesive layer 502. The adhesive used in this embodiment is an epoxy-based adhesive.

Incidentally, the side on which the above slider 220 is fixed to the suspension 200 is defined as the bottom surface of the suspension, and the side opposite to this side is defined as the top surface.

On the bottom surface of the second actuator 100 are formed connection electrodes 111 and 112 for supplying electric power to the second actuator, and the connection electrodes 111 and 112 are electrically connected,by soldering to lead-out electrodes 261 and 262 formed on the top surface 230 of the suspension-supporting member 230. The above connection by soldering contributes also to the mechanical connection of the second actuator and a suspension-holding arm.

Further, the surface of the second actuator 100 is coated with a coating resin 101. As the coating resin a low-viscosity epoxy resin-based adhesive is uniformly applied with a film thickness of not more than 10 μm by a well-known method such as a dispenser and an ink jet and is then caused to cure by irradiating light (UV and visible light) or by heating with the aid of an oven, hot plate, etc. Incidentally, in the curing of the resin, the combined use of heat and light is permitted.

Figure 3A:
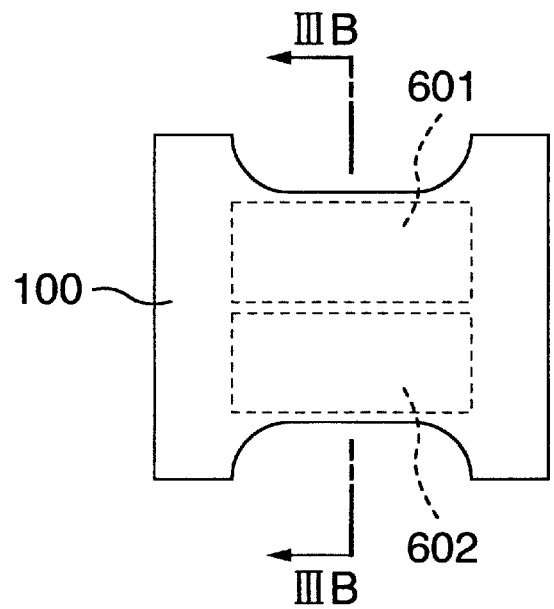
FIG. 3A is a top plan view of a second actuator in an embodiment of the present invention.
Figure 3B:
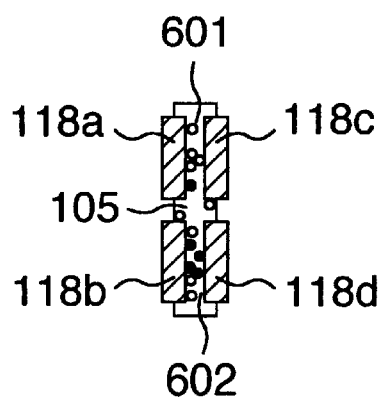
FIG. 3B is a sectional view of the second actuator shown in FIG. 3A, the view being taken along lines IIIB—IIIB of FIG. 3A.

FIG. 3A is a top view which shows a detailed construction of the second actuator 100 used in this embodiment. FIG. 3B is a sectional view of the second actuator shown in FIG. 3A taken along lines IIIB—IIIB of FIG. 3A.

The above second actuator is formed from a piezoelectric flat sheet 105 of sheet-like construction. This piezoelectric flat sheet 105 has two electrodes 118a and 118b on its top surface and two electrodes 118c and 118d on its bottom surface. Incidentally, the left side of FIG. 3B in the direction of thickness of the piezoelectric flat sheet is called herein the top surface, and the right side the bottom surface. Further, the piezoelectric flat sheet 105 has a polarized region 601, which is a region sandwiched between the electrodes 118a and 118c, and a polarized region 602, which is a region sandwiched between the electrodes 118b and 118d. In other words, there are two polarized regions in one piezoelectric flat sheet.

As mentioned above, the second actuator of this embodiment is a sheet-like structure formed from the piezoelectric flat sheet 105 which is provided with electrodes on its top and bottom surfaces and has two polarized regions in its interior.

Figure 4:
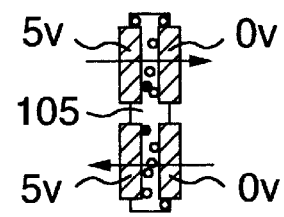
FIG. 4 is a sectional view of polarized regions of the second actuator.

Next, the operation of the second actuator is described. FIG. 4 is a sectional view which shows the directions of polarization within a piezoelectric flat sheet which constitutes the second actuator and an example of condition of an electric field for driving this actuator.

The directions of the two polarized regions in the piezoelectric flat sheet 105 are the thickness directions of the piezoelectric flat sheet and directions opposite to each other. As shown in FIG. 4, an electric field is applied to the piezoelectric flat sheet that is in this polarized condition. In other words, an electric field is applied to the polarized region 601 so that the polarization direction is the same as the direction of the electric field, and an electric field is applied to the polarized region 602 so that the polarization direction is opposite to the direction of the electric field.

Figure 5A:
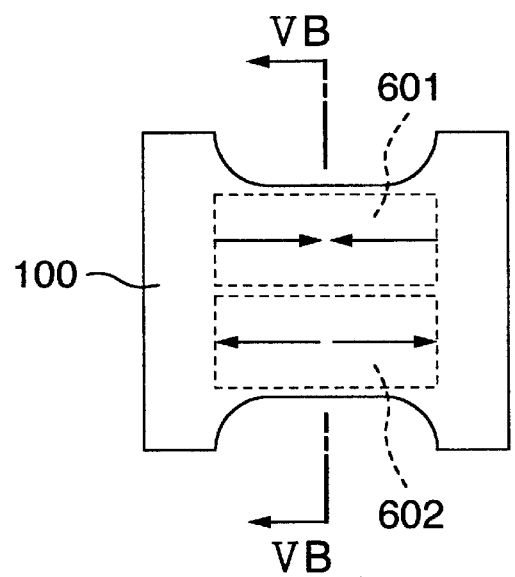
FIG. 5A is a top plan view of displacement of the second actuator.
Figure 5B:
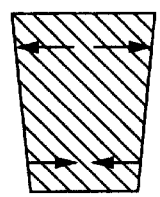
FIG. 5B is a sectional view of displacement of the second actuator shown in FIG. 5A, the view being taken along lines VB—VB of FIG. 5A.

The displacement in the plane (in the positioning direction) of the second actuator 100 when the above electric fields are applied is shown in the top plan view of FIG. 5A, FIG. 5B is a sectional view which shows the displacement in the thickness direction of the second actuator shown in FIG. 5A (the vertical direction with respect to the top surface of the actuator), the view being taken along lines VB—VB of FIG. 5A.

Because in the polarized region 601, the polarization direction is the same as the direction of the electric field, the displacement is such that contraction occurs in the in-plane direction and elongation occurs in the thickness direction. On the other hand, because in the polarized region 602, the polarization direction is opposite to the direction of the electric field, the displacement is such that elongation occurs in the in-plane direction and contraction occurs in the thickness direction.

Therefore, by applying the above electric fields to the second actuator, it is possible to displace the suspension 200 fixed to the second actuator 100 in the plane with respect to the suspension-supporting member 230, i.e., in the positioning direction of the actuator.

By changing the intensity and direction of electric fields applied to the piezoelectric flat sheet 105 by means of the above mechanism, it is possible to accomplish fine movements of the magnetic head fixed to the leading end of the suspension 200 in the positioning direction with high accuracy. Incidentally, on this occasion the second actuator 100 is displaced also in the thickness direction of the actuator as shown in FIG. 5B.

In a magnetic disk apparatus of another embodiment, the above second actuator is fixed between the suspension and the suspension-supporting member. Therefore, it is possible to provide not only a high-productivity magnetic disk apparatus, but also a high-reliability magnetic disk apparatus which permits stable reading-out and writing-in of information by the magnetic head.

Furthermore, laminating piezoelectric flat sheets enables the thickness of the piezoelectric flat sheet per lamination to be reduced, with the result that the intensity of electric fields applied to the piezoelectric flat sheet (voltage applied to the second actuator/thickness of the piezoelectric flat sheet) can be increased. For this reason, the displacement acting on the second actuator is proportional to the intensity of an electric field and, therefore, a large displacement can be obtained at a low voltage.

Moreover, because the second actuator is coated with a resin, it is possible to reduce fine particles of PZT, which is a material of the actuator, and those of the Au used in metallization, the fine particles being produced during the expansion and contraction of the piezoelectric flat sheet while a voltage is being applied.

The amount of dust during the operation of the above actuator was measured by means of a well-known particle counter. As a result, no particle of not less than 1 μm was detected within the magnetic disk apparatus and errors in the writing-in/reading-out of information did not occur.

A resin used in the coating by the method described in this embodiment provided a uniform film with a film thickness of not more than 5 μm after the curing of the resin, and the film after curing had flexibility with an elastic modulus of 700 MPa, an elongation of 50% and a Shore D hardness of 70. As a result, even when expansion and contraction was carried out about 10 billion times by repeating the application of an voltage of 5 V to the piezoelectric flat sheet, no crack was formed in the piezoelectric flat sheet itself.

On the other hand, the resin after curing was analyzed by means of a well-known mass spectrometer (GC-MS). As a result, an outgas (volatile organic molecules) released from the resin was detected and the amount of outgas was 0.005 μg per mg of resin. However, the amount of outgas itself is very small and it was ascertained that no error in the writing-in/reading-out of information in the magnetic disk due to the outgas occurred.

Incidentally, a method of applying electric fields to the two polarized regions in the piezoelectric flat sheet is not limited to that described in the above embodiment. For example, by applying different electric fields to the two polarized regions, an in-plane displacement different from that described in the above embodiment can be produced. Furthermore, although the number of polarized regions in the piezoelectric flat sheet is two in the above embodiment, three or more polarized regions may be provided.

Moreover, although in the above embodiment the second actuator is disposed so that it bridges the top surfaces of the suspension and suspension-supporting member, the second actuator may be disposed so that it bridges the bottom surfaces of the suspension and suspension-supporting member.

As the second actuator, one element that is the piezoelectric flat sheet is fixed so that it bridges the top surfaces of the suspension and suspension-supporting member. However, two elements may be fixed so that they bridge the top surfaces and the bottom surfaces of the suspension and suspension-supporting member. In this case, one element is fixed so that it bridges the top surfaces of the suspension and suspension-supporting member and the other element is fixed so that it bridges the bottom surfaces of the suspension and suspension-supporting member.

Although the second actuator is disposed between the suspension and the suspension-supporting member in the above embodiment, the second actuator may be disposed within the suspension-supporting member or within the suspension.

All the embodiments described above relate to a magnetic disk apparatus. However, it is needless to say that the embodiments may be adopted in a magnetic disk array apparatus in which a plurality of disk apparatuses are arranged or in a storage apparatus which uses a rotary recording medium other than a magnetic disk apparatus: for example, an optical disk apparatus and a magneto-optic recording device.

Next, another embodiment of the present invention will be explained with reference to the accompanying drawings.

Figure 6:
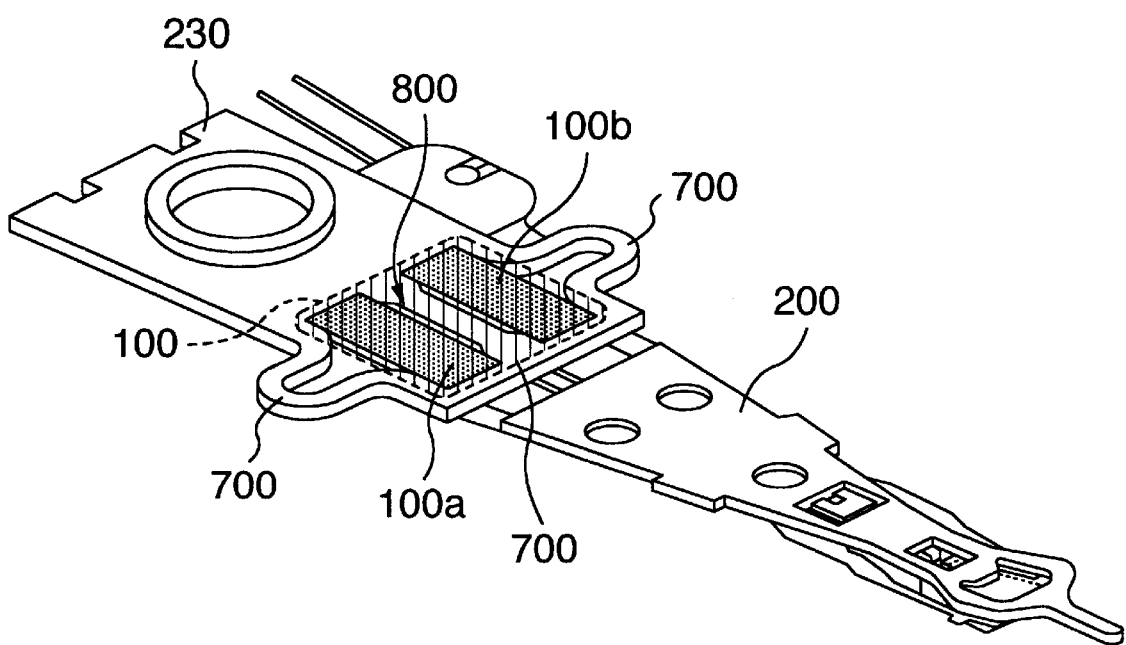
FIG. 6 is a top plan view of the whole of a magnetic head supporting mechanism in the magnetic disk apparatus of another embodiment of the present invention.

The resin coating for the second actuator described in the above first embodiment was applied to a head-supporting mechanism (FIG. 6) as described in FIG. 3 on page 691 of the Journal of the Institute of Electrical Engineers of Japan, Volume 120, No. 11 (November 2000). In other words, the same effect as described in connection with the above first embodiment is obtained also in a magnetic head-supporting mechanism (FIG. 6) in which the suspension 200 and suspension-supporting member 210 are connected by means of two elements 100*a* and 100*b*, which are horizontally disposed, and a φ-type hinge 700, a magnetic disk unit in which the above magnetic head-supporting mechanism is used, and a storage device in which a rotary recording medium other than a magnetic disk is used.

In this case, the resin coating is applied after the two elements 100*a* and 100*b* are electrically and mechanically connected to the suspension 200 and suspension-supporting member 210. On that occasion, there is a slight possibility that a gap 800 between the φ-type hinge 700 and the two elements 100*a* and 100*b* may be filled with the resin. However, even if the gap is filled with the resin, this does not have an effect on the displacement of the head that can be effected by the second actuator 100, i.e., the two elements 100*a* and 100*b*.

As a result of an experiment, the displacement in a case where the gap was filled with the resin used in the first embodiment (elastic modulus after curinng: 700 MPa) was not less than 99.9% of the amount of displacement in a case where the gap 800 was not filled with the resin.

Next, comparative examples are explained in order to compare them with the above embodiments.

Comparative Example 1

Next, comparative examples with respect to the above embodiments will be described below.

In a magnetic disk apparatus made without coating an actuator with a resin by the method described in JP-A-12-113615, the amount of dust was measured by means of the particle counter described in the above embodiments and 131 dust particles with a particle diameter of not less than 1 μm were detected. As a result, errors in the writing-in/reading-out of information by the magnetic disk occurred.

Comparative Example 2

As another comparative example, the resin coating of the actuator was performed using an epoxy adhesive with a general viscosity of 10000 mPa·s by the method described in the above embodiments. As a result, application was difficult because of the high viscosity of the adhesive and it was difficult to form a uniform film with a film thickness after curing of not more than 10 μm. The film after curing was hard with an elastic modulus of 200 MPa, an elongation of 3% and a Shore D hardness of 90. As a result of 10000 times of expansion and contraction of the piezoelectric element by the repeated application of a voltage of 5 V, cracks occurred in the piezoelectric element itself.

Comparative Example 3

As an additional comparative example, the resin coating of the actuator was performed using an acrylic adhesive with a general viscosity of 8000 mPa·s by the method described in the above embodiments. As a result, volatile organic molecules were generated as an outgas from the resin after curing. When an analysis was conducted by means of GC-MS, 1.1 μg of organic molecules per mg of resin were detected. As a result, errors in the writing-in/reading-out of information by the magnetic disk occurred.

As explained above, by coating the actuator with a resin, it is possible to realize an actuator which can be driven at a low voltage and that enables the generation of dust of fine particles to be reduced to a minimum because the vertical displacement relative to the top surface of the actuator during driving does not occur. As a result, it is possible to provide a magnetic disk apparatus which has high reliability in terms of the writing-in/reading-out characteristic of magnetic head and, at the same time, has high productivity.

While we have shown and described several embodiments in accordance with our invention, it should be understood that the disclosed embodiments are susceptible of changes and modifications without departing from the scope of the invention. Therefore, we do not intend to be bound by the details shown and described herein but intend to cover all such changes and modifications which fall within the scope of the appended claims.

What is claim is:

1. A magnetic disk apparatus comprising a magnetic head which performs the writing-in and reading-out of information, a magnetic disk on which information is stored, an elastic member which supports said magnetic head, a fixed member which supports said elastic member, and a first actuator and a second actuator for moving said magnetic head to a predetermined position on said magnetic disk, wherein said second actuator is disposed between and connected to said elastic member and said fixed member so as to form a bridge between said elastic member and said fixed member, and a surface of said second actuator is coated with a resin material, wherein the viscosity of said resin material before setting is not more than 1000 mpa·s.

2. A magnetic disk apparatus comprising a magnetic head which performs the writing-in and reading-out of information, a magnetic disk on which information is stored, an elastic member which supports said magnetic head, a fixed member which supports said elastic member, and a first actuator and a second actuator for moving said magnetic head to a predetermined position on said magnetic disk, wherein said second actuator is disposed between and connected to said elastic member and said fixed member so as to form a bridge between said elastic member and said fixed member, and a surface of said second actuator is coated with a resin material, wherein said resin material comprises epoxy oligomer of less than 20 wt % and epoxy monomer of not less than 80 wt % and further contains at least a polymerization initiator which reacts with the aid of heat or light, a catalyst and an additive.

3. A magnetic disk apparatus comprising a magnetic head which performs the writing-in and reading-out of information, a magnetic disk on which information is stored, an elastic member which supports said magnetic head, a fixed member which supports said elastic member, and a first actuator and a second actuator for moving said magnetic head to a predetermined position on said magnetic disk, wherein said second actuator is disposed between and connected to said elastic member and said fixed member so as to form a bridge between said elastic member and said fixed member, and a surface of said second actuator is coated with a resin material, wherein the elastic modulus of said resin material after curing is not more than 1000 Mpa.

4. A magnetic disk apparatus comprising a magnetic head which performs the writing-in and reading-out of information, a magnetic disk on which information is stored, an elastic member which supports said magnetic head, a fixed member which supports said elastic member, and a first actuator and a second actuator for moving said magnetic head to a predetermined position on said magnetic disk, wherein said second actuator is disposed between and connected to said elastic member and said fixed member so as to form a bridge between said elastic member and said fixed member, and a surface of said second actuator is coated with a resin material, wherein the Shore D hardness of said resin material after setting is not more than 80.

5. A magnetic disk apparatus comprising a magnetic head which performs the writing-in and reading-out of information, a magnetic disk on which information is stored, an elastic member which supports said magnetic head, a fixed member which supports said elastic member, and a first actuator and a second actuator for moving said magnetic head to a predetermined position on said magnetic disk, wherein said second actuator is disposed between and connected to said elastic member and said fixed member so as to form a bridge between said elastic member and said fixed member, and a surface of said second actuator is coated with a resin material, wherein the elongation of said resin material after curing is not less than 30%.

6. A head-supporting mechanism comprising a magnetic head which performs the writing-in and reading-out of information, an elastic member which supports said magnetic head, a fixed member which supports said elastic member, and an actuator for positioning said magnetic head, wherein said actuator is disposed between and connected to said elastic member and said fixed member so as to form a bridge between said elastic member and said fixed member, and a surface of said actuator is coated with a resin material, wherein said resin is a low-viscosity resin with a viscosity before curing of not more than 1000 mPa·s.

7. A head-supporting mechanism comprising a magnetic head which performs the writing-in and reading-out of information, an elastic member which supports said magnetic head, a fixed member which supports said elastic member, and an actuator for positioning said magnetic head, wherein said actuator is disposed between and connected to said elastic member and said fixed member so as to form a bridge between said elastic member and said fixed member, and a surface of said actuator is coated with a resin material, wherein said resin is an epoxy resin comprises epoxy oligomer of less than 20 wt % and epoxy monomer of not more than 80 wt % and contains at least a polymerization initiator which reacts with the aid of heat or light, a catalyst and an additive.

8. A head-supporting mechanism comprising a magnetic head which performs the writing-in and reading-out of information, an elastic member which supports said magnetic head, a fixed member which supports said elastic member, and an actuator for positioning said magnetic head, wherein said actuator is disposed between and connected to said elastic member and said fixed member so as to form a bridge between said elastic member and said fixed member, and a surface of said actuator is coated with a resin material, wherein the elastic modulus of said resin before curing is not more than 1000 MPa.

9. A head-supporting mechanism comprising a magnetic head which performs the writing-in and reading-out of information, an elastic member which supports said magnetic head, a fixed member which supports said elastic member, and an actuator for positioning said magnetic head, wherein said actuator is disposed between and connected to said elastic member and said fixed member so as to form a bridge between said elastic member and said fixed member, and a surface of said actuator is coated with a resin material, wherein the Shore D hardness of said resin before curing is not more than 80.

10. A head-supporting mechanism comprising a magnetic head which performs the writing-in and reading-out of information, an elastic member which supports said magnetic head, a fixed member which supports said elastic member, and an actuator for positioning said magnetic head, wherein said actuator is disposed between and connected to said elastic member and said fixed member so as to form a bridge between said elastic member and said fixed member, and a surface of said actuator is coated with a resin material, wherein the elongation of said resin after curing is not less than 30%.

11. A head-supporting mechanism according to any one of claims 6 and 7 to 10, wherein said resin is applied by using means such as a dispenser and an ink jet.

* * * * *